United States Patent
Ghosh

(10) Patent No.: US 11,261,133 B2
(45) Date of Patent: Mar. 1, 2022

(54) METHOD OF MAKING SUPER-HARD ARTICLES

(71) Applicant: Element Six (UK) Limited, Oxfordshire (GB)

(72) Inventor: Santonu Ghosh, Oxfordshire (GB)

(73) Assignee: Element Six (UK) Limited, Oxfordshire (GB)

( * ) Notice: Subject to any disclaimer, the term of this patent is extended or adjusted under 35 U.S.C. 154(b) by 0 days.

(21) Appl. No.: 15/327,047

(22) PCT Filed: Jul. 10, 2015

(86) PCT No.: PCT/EP2015/065869
§ 371 (c)(1),
(2) Date: Jan. 18, 2017

(87) PCT Pub. No.: WO2016/008821
PCT Pub. Date: Jan. 21, 2016

(65) Prior Publication Data
US 2017/0144936 A1     May 25, 2017

(30) Foreign Application Priority Data

Jul. 18, 2014 (GB) ..................................... 1412809

(51) Int. Cl.
*C04B 35/5831* (2006.01)
*C22C 26/00* (2006.01)
(Continued)

(52) U.S. Cl.
CPC ............ *C04B 35/5831* (2013.01); *B22F 3/20* (2013.01); *B28B 3/025* (2013.01); *B28B 19/00* (2013.01);
(Continued)

(58) Field of Classification Search
CPC ............................ C04B 35/5831; B28B 3/025
(Continued)

(56) References Cited

U.S. PATENT DOCUMENTS 4,124,401 A * 11/1978 Lee ........................ B01J 3/062
501/90
4,321,230 A * 3/1982 Hungerford ............ B29C 48/08
264/556
(Continued)

FOREIGN PATENT DOCUMENTS

| EP | 0357379 A2 | 3/1990 |
|----|------------|--------|
| EP | 0528243 B1 | 4/1996 |

(Continued)

OTHER PUBLICATIONS

Friction and Wear of Ceramics, Buckley, D. H., Miyoshi, K., CRC Press (Year: 1993).*

(Continued)

*Primary Examiner* — Jacob T Minskey
*Assistant Examiner* — Russell E Sparks
(74) *Attorney, Agent, or Firm* — Armstrong Teasdale LLP

(57) ABSTRACT

This application describes a method of making a super-hard article that includes a super-hard structure bonded to a substrate. The super-hard structure generally includes a sintered plurality of super-hard grains made from cubic boron nitride. The method generally includes providing raw material powder suitable for sintering the super-hard structure; combining the raw material powder with an organic binder material in a liquid medium to form a paste; providing a substrate assembly having a formation surface area configured for forming a boundary of the super-hard structure, the substrate having a recess coterminous with the formation surface area; extruding the paste into contact with the formation surface area to provide a paste assembly; and (Continued)

heat treating and/or sintering the paste assembly to remove the binder material and provide a pre-sinter assembly.

14 Claims, 2 Drawing Sheets

(51) Int. Cl.

| | | |
|---|---|---|
| B28B 19/00 | (2006.01) | |
| B22F 3/20 | (2006.01) | |
| B22F 5/00 | (2006.01) | |
| C04B 35/626 | (2006.01) | |
| C04B 35/638 | (2006.01) | |
| B28B 3/02 | (2006.01) | |
| C04B 35/634 | (2006.01) | |
| C04B 35/645 | (2006.01) | |
| C04B 35/528 | (2006.01) | |
| C04B 41/50 | (2006.01) | |
| C04B 35/622 | (2006.01) | |
| C04B 35/632 | (2006.01) | |
| C04B 35/64 | (2006.01) | |
| B23P 15/34 | (2006.01) | |

(52) U.S. Cl.
CPC ........ *C04B 35/528* (2013.01); *C04B 35/6263* (2013.01); *C04B 35/62222* (2013.01); *C04B 35/632* (2013.01); *C04B 35/634* (2013.01); *C04B 35/638* (2013.01); *C04B 35/64* (2013.01); *C04B 35/645* (2013.01); *C04B 41/5064* (2013.01); *C22C 26/00* (2013.01); *B22F 2005/001* (2013.01); *B22F 2998/10* (2013.01); *B23C 2226/125* (2013.01); *B23C 2226/315* (2013.01); *B23P 15/34* (2013.01); *C04B 2235/386* (2013.01); *C04B 2235/427* (2013.01); *C04B 2235/608* (2013.01); *C04B 2235/6021* (2013.01); *C22C 2026/003* (2013.01); *C22C 2204/00* (2013.01)

(58) Field of Classification Search
USPC .......................................................... 264/109
See application file for complete search history.

(56) References Cited

U.S. PATENT DOCUMENTS

| | | | | |
|---|---|---|---|---|
| 4,407,690 A * | 10/1983 | White | ..................... | B05C 5/001 156/244.27 |
| 4,762,445 A * | 8/1988 | Bunting | .................. | B23B 51/02 408/144 |
| 4,866,885 A * | 9/1989 | Dodsworth | ............ | B24D 3/008 51/293 |
| 4,887,496 A | 12/1989 | Kobayashi | | |
| 4,959,929 A * | 10/1990 | Burnand | .................. | B22F 7/06 407/119 |
| 5,070,748 A * | 12/1991 | Packer | ..................... | B23C 5/006 407/118 |
| 5,560,754 A * | 10/1996 | Johnson | ................... | B01J 3/062 51/297 |
| 5,685,671 A | 11/1997 | Packer et al. | | |
| 5,963,775 A * | 10/1999 | Fang | ..................... | B22F 3/1021 327/331 |
| 6,290,438 B1* | 9/2001 | Papajewski | ............ | B23D 77/02 408/145 |
| 7,104,160 B2* | 9/2006 | Fries | ......................... | B22F 7/06 76/108.1 |
| 7,235,211 B2 | 6/2007 | Griffo et al. | | |
| 7,360,972 B2* | 4/2008 | Sjogren | ................... | B22F 5/003 29/411 |
| 8,546,522 B2* | 10/2013 | Kim | ......................... | B29C 48/37 528/502 R |
| 8,667,866 B2* | 3/2014 | Singh | ...................... | B22F 7/062 76/101.1 |
| 9,327,385 B2* | 5/2016 | Webb | ........................ | B24D 3/00 |
| 2002/0162691 A1 | 11/2002 | Fang et al. | | |

FOREIGN PATENT DOCUMENTS

| | | | | |
|---|---|---|---|---|
| GB | 2481911 A | 1/2012 | | |
| GB | 2496512 A | 5/2013 | | |
| GB | 2504824 A | 2/2014 | | |
| JP | 11291111 A | 10/1999 | | |
| JP | 2013516330 A | 5/2013 | | |
| WO | 2011084864 A2 | 7/2011 | | |
| WO | WO-2013068469 A1 * | 5/2013 | ............... | B22F 3/20 |
| WO | 2013156536 A1 | 10/2013 | | |
| WO | 2013178804 A1 | 12/2013 | | |

OTHER PUBLICATIONS

Combined Search and Examination Report for GB1412809.4, dated Jun. 25, 2015 (7 pages).
Combined Search and Examination Report for GB1512093.4, dated Apr. 27, 2016 (6 pages).
International Search Report and Written Opinion for PCT/EP2015/065869, dated Sep. 25, 2015 (9 pages).

* cited by examiner

METHOD OF MAKING SUPER-HARD ARTICLES

CROSS REFERENCE TO RELATED APPLICATIONS

This application is the U.S. national phase of International Application PCT/EP2015/065869 filed on Jul. 10, 2015 and published in English on Jan. 21, 2016 as International Publication No. WO 2016/008821 A1 which claims priority to Great Britain Patent Application No. 1412809.4 filed on Jul. 18, 2014.

FIELD OF THE INVENTION

This disclosure relates generally to methods for making articles comprising super-hard structures, particularly but not exclusively for use in making tools.

BACKGROUND

U.S. Pat. No. 7,235,211 discloses a method of making functionally engineered composite wear surfaces provided on cutting elements used with rotary cone rock bits. The method includes applying a conformable material mixture to an interface surface of the cutting element to provide a green state material layer. The material mixture can be pre-formed into a part shaped to fit over the interface surface. The applied material mixture is pressurised under conditions of elevated temperature to consolidate and sinter the material mixture, thereby forming the wear resistant surface, in a manner that avoids unwanted material migration between the applied material mixture and substrate.

There is a need for composite articles comprising super-hard material, particularly but not exclusively for use as pre-form bodies for making machine tools, wear-resistant components and pick tools for pavement milling or mining; and for relatively efficient methods for making them.

SUMMARY

According to a first aspect, there is provided a method of making a super-hard article comprising a super-hard structure bonded to a substrate, the super-hard structure comprising a sintered plurality of super-hard grains. The method includes providing raw material powder suitable for sintering the super-hard structure. The raw material powder is combined with organic binder material in a liquid medium to form paste. The content of the raw material powder is more than 60 and less than 85 mass percent of the paste and the composition of the paste is such that it has a shear rate of at most 25 inverse second ($s^{-1}$). A substrate assembly is provided, which comprises the substrate, having a formation surface area configured for forming a boundary of the super-hard structure, the substrate comprising a recess coterminous with the formation surface area. The paste is extruded into contact with the formation surface area to provide a paste assembly. The paste assembly is heat treated to remove the binder material and provide a pre-sinter assembly. The pre-sinter assembly is subjected to a pressure and temperature sufficient to sinter the raw material powder and transform it into the super-hard structure bonded to the substrate at a boundary coterminous with the formation surface area.

Variations of the method are envisaged by this disclosure for making various example arrangements of super-hard articles for various applications, of which the following are non-limiting, non-exhaustive examples.

In some examples, the pressure may be at least about 3, at least about 5 or at least about 6 gigapascals (GPa). The temperature may be at least about 1,200, at least about 1,300 or at least about 1,400 degrees Celsius. The pre-sinter assembly will be subjected to the pressure and the temperature for a period of time sufficient to transform substantially all of the raw material powder into the super-hard structure.

In some examples, the content of the raw material powder in the paste may be at least 70 and or at most 80 mass percent of the paste. In some examples, paste may comprise about 70 to 85 mass percent raw material powder. In some examples, the content of the raw material powder in the paste may be greater than 36, at least about 40 or at least about 42 volume percent of the paste; and or less than 59, at most about 55 or at most 53 volume percent of the paste.

In general, the shear rate of the paste can be controlled in various ways. For example, one or more of the following aspects of may be selectively controlled to achieve a desired shear rate: the type of binder material, relative amount of the liquid in which the binder material is present, the grain size and or shape distribution, and or the specific surface area of the raw material powder grains. In various examples, the composition of the paste may be such that it has a shear rate of at least 1, at least about 3 or at least about 8 inverse seconds ($s^{-1}$); and or less than 21, at most 16, less than 16, at most 15 or less than 15 inverse seconds ($s^{-1}$). In some examples, the composition of the paste may be such that it has a shear rate of shear rate of 8 to 16 inverse seconds ($s^{-1}$).

The type of organic binder material may be selected with a view to reducing the amount of its residue remaining among the raw material powder grains after it has been removed from the paste by the heat treatment. In some examples, the binder may be selected such that it is not capable of dissolving in water. The binder may be capable of dissolving in alcohol.

Substantially all or most of the binder material may be removed by the heat treatment of the paste assembly, and or some residue of the binder material may remain in contact with the raw material powder. For example, carbon-containing residue may remain, and or the residue may be present as a coating or film on the surfaces of at least some of the raw material powder grains. After heat treatment, the arrangement of the raw material powder comprised in the pre-sinter assembly will be substantially the same as that in the paste assembly, and will comprise a continuous network of empty pores among the raw material powder grains.

In some examples, the paste may contact substantially all of the formation surface area. In some examples, the formation surface area may include a planar area. Some degree of deformation of the substrate and consequently the formation surface area may occur at the pressure and temperature, and therefore the substrate assembly may need to be configured to take this into account.

In some examples, the method may include applying a pressure of 5 to 9 megapascals (MPa) to the paste; for example, the method may include applying a pressure of 5 to 9 megapascals (MPa) to extrude the paste and or to compact the extruded paste.

In some examples, the super-hard grains may comprise or consist of natural or synthetic diamond crystals and the super-hard structure may comprise or consist of polycrystalline diamond (PCD) material; or the super-hard grains may comprise or consist of cubic boron nitride crystals and the super-hard structure may comprise or consist of polycrystalline cubic boron nitride (PCBN) material.

In some examples, the substrate may comprise or consist of cemented carbide material; and or the substrate may comprise or consist of super-hard material coterminous with the formation area; and or the substrate may comprise or consist of precursor material capable of being sintered to form polycrystalline super-hard material (such as PCD or PCBN material), the precursor material being coterminous with the formation surface area. In some examples, the substrate assembly may comprise a layer of precursor material capable of being sintered to form polycrystalline super-hard material (such as PCD or PCBN), the layer in contact with cemented carbide material and coterminous with the formation surface area.

In some examples, the super-hard article may comprise or consist of first and second polycrystalline super-hard materials bonded to each other and differing in at least one characteristic (such as macro- or micro-structural, composition or other characteristic); the method including depositing precursor material paste for forming the first polycrystalline super-hard material into contact with the substrate to provide the substrate assembly, the precursor material paste for the first polycrystalline material comprising organic binder material in a liquid medium and more than 60 and less than 85 mass percent precursor powder and having a shear rate of at most 25 inverse second ($s^{-1}$); and a surface of the precursor material paste being coterminous with the formation surface area; in which the super-hard structure comprises or consists of the second polycrystalline super-hard material. In some examples, the precursor material may comprise an aggregation of grains, which may comprise a plurality of super-hard grains.

Some example methods may include providing at least two powder aggregations both in paste form, in contact with each other at a common boundary, each differing from the other in at least one characteristic (for example, raw material powder composition, size distribution of the grains such as the super-hard grains, or some other physical, macro-structural or micro-structural characteristic). The heat treatment of the paste assembly may result in the removal of binder material from both pastes.

For example, the first and second polycrystalline super-hard materials may each comprise or consist of PCD and or PCBN material. In some examples, the first and second polycrystalline super-hard materials may comprise or consist of different grades of PCD material, or different grades of PCBN material; or one of the polycrystalline super-hard materials may comprise or consist of PCD material and the other may comprise or consist of PCBN material.

In some examples, the substrate assembly may comprise a member in contact with the substrate, configured to form a cavity formed between the formation surface area and a boundary of the member, the cavity configured for forming the super-hard structure; the method including extruding the paste into the cavity. For example, the substrate assembly may comprise a sleeve containing the substrate; the sleeve may comprise refractory metal (such as niobium, molybdenum or tantalum), or the sleeve may comprise ceramic material.

In some examples, the substrate my comprise or consist of cemented carbide material and has a pair of opposite ends connected by a side including an elongate recess coterminous with the formation surface area and extending between the opposite ends.

In some examples, the method may include encapsulating the substrate assembly within a capsule suitable for an ultra-high pressure press apparatus and subjecting the capsule to the pressure and the temperature; removing the capsule from the ultra-high press apparatus and removing capsule material from the super-hard article.

In some examples, the super-hard article may have a substantially cylindrical shape, comprising a cylindrical side connecting opposite ends, a surface of the substrate and a surface of the super-hard structure being coterminous with the side. In some examples, the super-hard article may comprise a plurality of elongate super-hard structures arranged along helical paths.

In some examples, the method may include processing the super-hard article and forming a cutter element for a machine tool, such as a rotary machine tool (for example, an end mill or twist drill). The method may include forming a cutting edge on the super-hard structure; and or removing material from the substrate to provide a flute.

BRIEF DESCRIPTION OF THE DRAWINGS

Non-limiting example methods for making example arrangements of super-hard articles will be described with reference to the accompanying drawings, of which

DETAILED DESCRIPTION

Figure 1A:
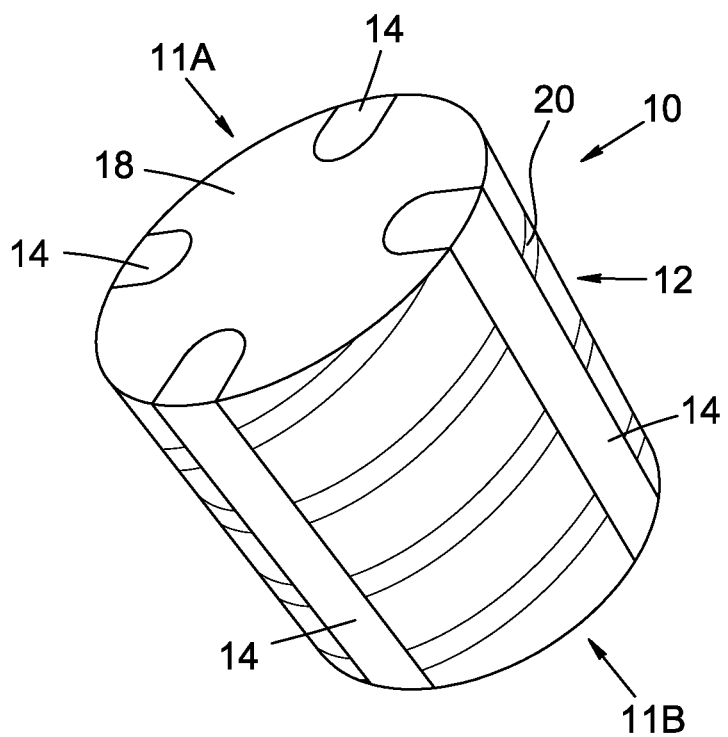
FIG. 1A shows a schematic perspective view of an example arrangement of a pre-form (or 'blank') body that can be processed to form a super-hard end mill tool.
Figure 1B:
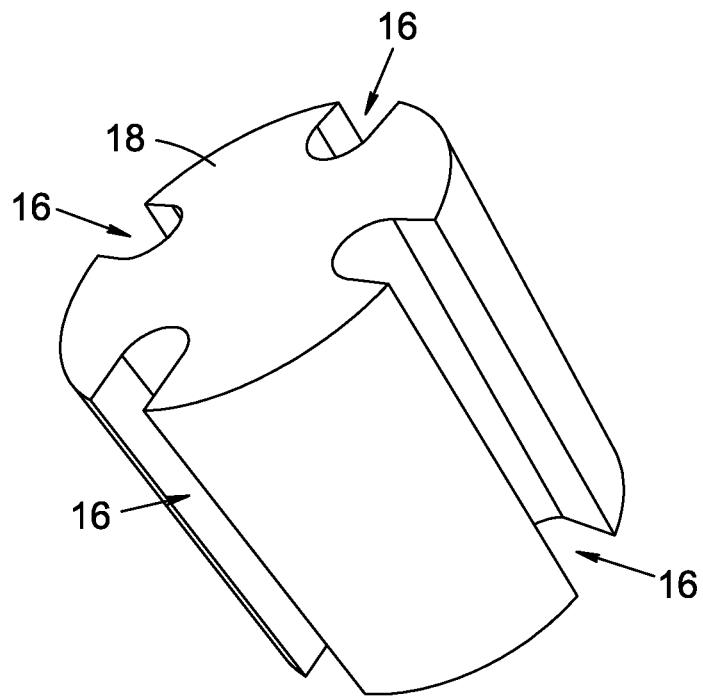
FIG. 1B shows a schematic perspective view of the example substrate configuration that can be used for making the example pre-form body illustrated in FIG. 1A.
Figure 1C:
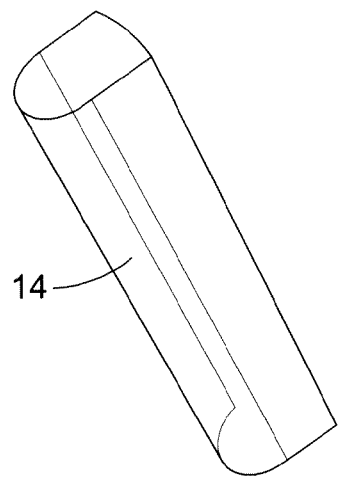
FIG. 1C shows a schematic perspective view of an example configuration of one of the super-hard structures of the example pre-form body illustrated in FIG. 1A.

A non-limiting example method of manufacturing an example arrangement of a super-hard article will be described, in which the super-hard article is a cutter element for an end mill tool. Other examples may include wear resistant components such as parts for gears and tips for picks, such as picks for road milling or mining.

Three Example and three Comparative super-hard articles for use as pre-form bodies for making a mill tool were made, in which different contents of organic binder solutions were used to make the paste.

With reference to FIG. 1A to FIG. 1D, the pre-form body 10 had an elongate cylindrical shape, comprising a pair of planar opposite ends 11A, 11B connected by a cylindrical side 12, four axially aligned and azimuthally equidistant polycrystalline cubic boron nitride (PCBN) composite material vein structures 14 extending from one 11A end to the other 11B and coterminous with the side 12. The PCBN vein structures 14 were embedded within recesses 16 within a substrate 18 consisting of cemented tungsten carbide material. The substrate body had a diameter of 21 mm. The PCBN material was grade DBW85(™), a commercially available PCBN material available from Element Six™.

The raw material powder for the PCBN material was prepared by blending cBN grains with aluminium (Al) powder having a mean grain size of about 6 microns, the mass content of the cBN being about 90 percent of the blended powders and the balance consisting of the Al powder. The cBN grains had a mean size in the range of 3 to 8 microns, in terms of equivalent circle diameter (ECD) as measured by laser diffractometric means. A solution of organic binder material comprising poly(vinyl butyral-covinyl alcohol-co-vinyl acetate and polyethylene glycol (PEG) mixed with the same mass of ethanol. Three Example and three Comparative pastes were prepared comprising the binder solution mixed with the blended raw material powder.

Figure 1D:
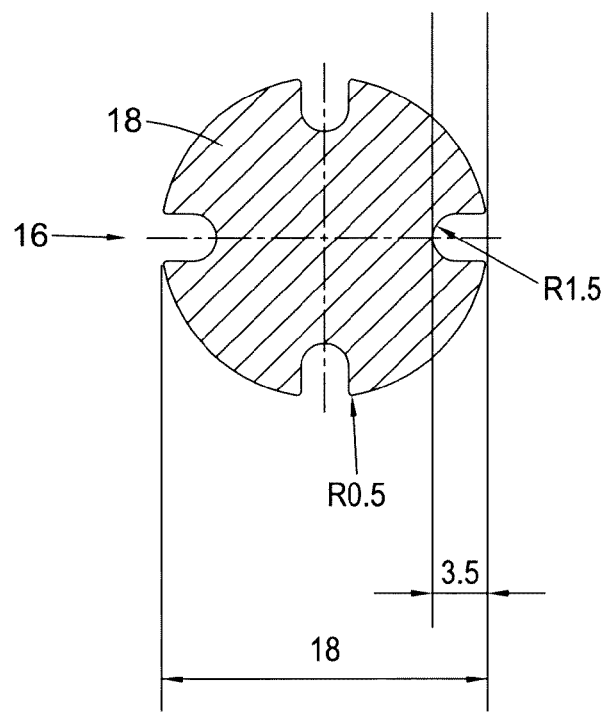
FIG. 1D shows a lateral cross section view of the example substrate illustrated in FIG. 1B (length dimensions are in millimetres, mm).

Substrates having the same configuration were used in the Example and Comparative specimens. With reference to FIG. 1D, each substrate 18 had a diameter of 18 millimetres (mm) and comprised four azimuthally equidistant recesses 16 extending from one end of the substrate 18 to the opposite end. The surfaces of the recesses 16 provided the formation surface areas of the substrate 18. Each recess 16 had the general shape of a 'U'-shaped channel, in which the radial distance between the inner-most surface area of the recess 16 was 3.5 millimetres (mm) from the circumference of the substrate 18 (from a circle that would circumscribe the lateral cross section of the substrate) and the radius of curvature of the innermost area (in other words, the 'bottom') of the recesses 16 was 1.5 millimetres (mm). The edges of the recesses 16, where the recess meets the circumferential side of the substrate 18, were provided with a hone (a rounded edge) of 0.5 millimetres (mm). The recesses 16 were configured such that configuration and size of each sintered super-hard vein structure 14 would be as desired. The diameter of the substrate 18 and depth of the recesses 16 were provided slightly larger than required so that some material could be removed from the side of the pre-form article to process it to the desired final dimensions and remove slight variations or deviations of the side from that desired.

The sides of the substrates 18 were enclosed within respective sleeves (not shown) consisting of niobium (Nb), thus providing four elongate, open-ended cavities defined by the recesses 16 and inner surface areas of the sleeve. An extrusion device was provided, having a nozzle configured for injecting string-like lengths of paste directly into the cavities, such that the lengths of paste had a cross sectional diameter of about 3 millimetres (mm). In all cases, a compaction tool was used to apply a pressure longitudinally onto the injected paste to increase its density, the compaction pressure estimated to be about 5 megapascals (MPa) with an uncertainty of about 5 MPa. The pastes of Examples 1 to 3 comprised three different amounts of binder solution, ranging from 20 to 30 mass percent, estimated to be about 47 to 58 volume percent of the paste. In each example, the paste was extrusion-injected into each of the four cavities to provide paste assemblies. In the Example and Comparative cases, the paste was extruded as string-like structures of various viscosities and stiffness. In the Examples 1, 2 and 3, the paste was sufficiently viscous to allow it to be pressurised in the cavities in order to achieve higher material density and completely fill the channels.

The paste assemblies were subjected to heat treatment at 1,000 degrees Celsius within flowing nitrogen gas for 30 minutes in order to remove substantially all of the organic binder to provide pre-sinter assemblies. Potentially, some carbonaceous residue estimated to be at most about 1 mass percent of the raw material powder arrangement might have remained in the powder. The density of the raw material powder after the binder had been removed was estimated to be about 50 percent of maximum theoretical density, the balance of the volume being pores. While wishing not to be bound by a particular theory, the residue may play a role in protecting the raw material powder from oxygen contamination of the surfaces of the powder grains.

The pre-sinter assemblies were encapsulated into capsules suitable for a belt-type ultra-high pressure press and subjected to a uni-axially applied pressure of about 5.5 gigapascals (GPa) and a temperature of about 1,300 degrees Celsius for about 5 minutes to sinter the raw material powders and form a sintered article comprising the PCBN veins bonded to the substrates within each of the four recesses. In other examples, ultra-pressure presses other than belt-type presses may be used and may provide certain advantages. For example, the use of cubic or tetrahedral presses may produce a more uniformly sintered body since the pressure will be applied more iso-statically, from more than two opposite directions.

The cBN content in the sintered discs was about 85 mass percent, the difference between the mass content in the pre-sinter aggregation and in the sintered veins arising substantially from the dissolution of the grains in the aluminium and the subsequent formation of aluminium nitride that constituted the major part of the binder matrix within which the cBN grains were dispersed.

After the sintering process, the remaining material from the sleeve was removed by grinding and the side of the body was ground to the desired diameter. Since the sintered PCBN veins were slightly recessed a result of the sintering, only a small amount of PCBN material was ground away, thus improving the efficiency of the process because PCBN is ultra-hard and may need to be ground by means of diamond grains in a relatively slow process. After the treatment the ultra-high pressure and the initial processing, the diameter of the sintered article was 17 millimetres (mm) and its length was 16.5 millimetres (mm). The sintered article was processed further by means of grinding to provide the super-hard structures with cutting edges and to form flutes 20 into the substrate azimuthally between the super-hard structures, to provide a cutting element for an end mill tool.

Table 1 summarises certain parameter values and outcomes of Examples 1, 2 and 3 as well as the Comparative examples 1, 2 and 3, as well as the shear rate of the paste and the density of the raw material after the binder material has been removed and the porous raw material powder arrangement dried in an oven, if it was possible to measure these.

TABLE 1

| | Paste composition, mass % of paste | | Paste composition, volume % of paste | | | | |
|---|---|---|---|---|---|---|---|
| | Binder solution | Raw material powder | Binder solution | Raw material powder | Shear rate, $s^{-1}$ | Dried density $g \cdot cm^{-3}$ | Comment |
| Comparative 1 | 8 | 92 | 28 | 72 | — | — | Paste not formed |
| Comparative 2 | 15 | 85 | 41 | 59 | — | — | Extrude disintegrated |

TABLE 1-continued

|  | Paste composition, mass % of paste | | Paste composition, volume % of paste | | | | |
|---|---|---|---|---|---|---|---|
|  | Binder solution | Raw material powder | Binder solution | Raw material powder | Shear rate, $s^{-1}$ | Dried density $g \cdot cm^{-3}$ | Comment |
| Example 1 | 20 | 80 | 47 | 53 | 0 to 3 | 3.8 |  |
| Example 2 | 25 | 75 | 54 | 46 | 8 ± 4 | 3.6 |  |
| Example 3 | 30 | 70 | 58 | 42 | 16 ± 6 | 3.6 |  |
| Comparative 3 | 40 | 60 | 64 | 36 | 21 ± 6 | 3.4 | Extrude shape deformed |

As commented in Table 1, paste having too low a shear rate, less than about 1 inverse second ($s^{-1}$) tended to be too viscous to extrude or tended to disintegrate. Paste having too high a shear rate, greater than about 27 inverse second ($s^{-1}$) tended to be insufficiently viscous and to deform substantially as used in the example disclosed method. Paste having shear rates between these limit rages tended to be suitable for use in the example disclosed method.

Certain example disclosed methods of making super-hard mill tools may have the aspect of being relatively efficient and convenient, potentially arising from combining the steps of extrusion of paste and injecting it directly into contact with the formation surface area of the substrate. In effect, the substrate will provide at least a part of a mold for forming the super-hard structure and will be part of the super-hard article, the super-hard structure being bonded to it during the process of sintering.

Certain example methods may have the aspect of resulting in pre-form articles having improved dimensional accuracy and requiring less processing to form a finished tool or component.

Generally, disclosed example methods may have the effect of reducing or substantially eliminating the movement or rearrangement of raw material powder grains with respect to each other following removal of the binder material (in other words, the arrangement of the raw material powder in the form of paste may be substantially preserved after the binder has been removed). This may make it easier to sinter super-hard articles to substantially tighter shape and dimensional tolerances, and or to achieve more uniform density of the sintered super-hard structure. In particular, sintering at ultra-high pressure of at least about 3 gigapascals (GPa) will likely be substantially more sensitive to variations or deformations in the arrangement of the raw material powders than sintering at much lower pressures of up to several hundred megapascals (MPa), and even relatively small variations in the raw material powder arrangement may result in more significant variation in the arrangement and or the density of the sintered super-hard article. Consequently, disclosed example methods will likely enhance the reliability and accuracy of sintering the super-hard articles (particularly but not exclusively articles in which the configuration of the super-hard structure or structures is relatively complex), such that their shape and dimensions are as close as possibly to that desired for the finished article. Processing of the super-hard article to form a finished tool or component may thus be reduced. Since the processing of super-hard material such as PCD and PCBN is relatively time consuming and costly, and will likely require specialised equipment, disclosed example methods will likely result in significant improvement in the efficiency of making certain super-hard articles by sintering raw material powder at ultra-high pressure and high temperature.

Disclosed example methods may have the aspect of making the pre-sinter assembly more robust for handling prior to the step of sintering.

Example disclosed methods in which the substrate assembly comprises or consists of precursor powder material, which may also be in the form or paste, may have the aspect of reducing or substantially eliminating the risk that the grains from the extruded paste become interspersed with those of the substrate assembly. The risk of granular interspersion may arise when the binder is removed from the paste during the heat treatment, when there may be a risk of some degree of rearrangement of the raw material powders. Therefore, certain example methods may have the aspect of being capable of providing a super-hard article comprising at least two super-hard regions bonded together at a boundary, each comprising a different super-hard material or a different grade of super-hard material, in which the transition between the regions across the boundary is relatively sharp, or abrupt. In other words, the risk of an intermediate transition layer arising during the manufacturing process, and or the thickness of such an intermediate layer may be reduced.

In examples where the organic binder is non-aqueous and substantially not capable of dissolving in water, the risk of deposition of oxide impurity on the surfaces of the raw material powder grains may be reduced, which may enhance the sintering of the super-hard structure.

Certain terms and concepts as used herein are briefly explained below.

As used herein, viscosity is a flow property of material, representing the resistance to shearing of the material. Viscosity is the ratio of shear stress, being force per unit area, to shear rate, being the speed of flow divided by a gap over which the speed of flow changes from zero to the flow speed. The unit of shear stress is therefor that of pressure, namely Pascals (Pa) and the unit of shear rate is inverse time ($s^{-1}$), and consequently the unit of viscosity is Newton seconds (Pa·s).

As used herein, material such as paste extruded from an extrusion device may be referred to as 'extrude'. Extrude may have many different forms, such as string-like or tape-like lengths, or lengths having more complex shapes, which may have substantially the same cross-section shape as a cavity into which the extrude will be injected.

As used herein, a machine tool is a powered mechanical device that may be used to manufacture components by the selective removal of material from a work-piece, a process that may be referred to as machining. A body to be machined in the manufacture of an article may be referred to as a work-piece material and, in general, may comprise metal, alloys, composite materials, wood, polymers, including carbon fibre-reinforced polymers. A cutting tool may have a rake face, being a surface or surfaces over which chips from the work-piece, the rake face directing the flow of newly formed chips. 'Chips' are the pieces of a body removed from the work surface of the body by a machine tool in use. The flank of a cutter insert is the surface that passes over the machined surface produced on the body by the cutter insert. The flank may provide a clearance from the body and may comprise more than one flank face. A cutting edge is the edge of a rake face intended to perform cutting of a body.

As used herein, super-hard material has a Vickers hardness of at least about 25 gigapascals (GPa). Synthetic and natural diamond crystals, cubic boron nitride (cBN) crystals, polycrystalline diamond (PCD) material and polycrystalline cBN are examples of super-hard materials.

As used herein, PCD material comprises a plurality of diamond grains, a substantial number of which are directly inter-bonded with each other, and filled or empty pores among the diamond grains. PCD material is made by subjecting an aggregation of a plurality of diamond grains (which will likely have the appearance of fine powder) to an ultra-high pressure of at least about 5.5 gigapascals (GPa) and a high temperature in the presence of catalyst material suitable for promoting the direct inter-bonding of the diamond grains. Example catalyst materials for diamond include cobalt (Co), iron (Fe), nickel (Ni) and manganese (Mn), and alloys including more than one of these metals, and the high temperature will be sufficiently high for the catalyst material to be in the molten state.

As used herein, PCBN material comprises a range of various grades (or types) of composite materials that include grains of cBN dispersed within and bonded to a binder matrix. In some examples of PCBN material, the content of cBN grains is at least about 60 volume percent, at least about 70 volume percent or at least about 80 volume percent. The binder matrix may include metal, such as aluminium (Al), cobalt (Co), tungsten (W) or titanium (Ti) in the form of chemical compounds such as nitrides, borides (including di-borides), carbo-nitrides, or in solid solution. The binder matrix may include nickel-based super-alloy material, ceramic material, inter-metallic phase material. PCBN may be divided into two broad groups, namely "low cBN" and "high cBN", in which the cBN content is about 30 to 70 volume percent and about 70 to 95 volume percent, respectively. High cBN materials are likely to be used for operations involving a higher degree of interrupted cutting, which may occur as a result of shape features of the work-piece or the material comprised in it. Higher cBN content tends to result in stronger PCBN, which is especially important for interrupted operations.

As used herein, a 'grade' of PCD and PCN materials refers to compositional and or micro-structural characteristics of the material. For example, different grades of PCD may differ from each other in the size distributions of the diamond grains and or the overall contents of diamond grains and or the contiguities of diamond grains comprised in the PCD material grades. Different grades of PCBN material may differ from each other in the size distributions of the cBN grains and or the overall contents of cBN grains and or the binder matrix comprised in the PCBN material grades.

As used herein, 'to sinter' or 'sintering' a plurality of grains means to treat the grains by a process including the application of heat and pressure so as to cause them to coalesce into a solid multi-granular structure (which may also be referred to as a polycrystalline structure). The grains will be relatively small (for example, less than about 100 or about 50 microns in size) and appear as powder, which may be referred to as 'raw material powder' or 'precursor material' for sintering the polycrystalline structure. During the process of sintering, grains comprised in the raw material powder may be transformed to some degree or even destroyed, such as by melting, dissolving, chemical reaction or phase change. The multi-granular structure may comprise or consist of the substantially same grains that were comprised in the raw material powder and or grains that were formed in the sintering process, such as by crystal precipitation. Grains in the multi-granular structure may be bonded to or inter-grown with each other as a result of the sintering process. In various examples, sintering may involve solid or liquid state diffusion, liquefaction of at least some of the grains, partial or entire dissolution of grains, catalytic effect, precipitation and growth of grains, direct inter-growth of adjacent grains, chemical reactions between material comprised in adjacent grains (reaction bonding), or other physical or chemical processes that may promote the coalescence of grains.

While super-hard materials are extremely hard, they are generally less strong and tough than cemented carbide materials, and consequently they are more prone to fracture and chipping. Cemented carbide cutting tools may yield better tool life than PCD and PCBN tools due to their higher toughness and chip resistance, despite the fact that PCD and PCBN are vastly more resistant to abrasion. For example, standard texts indicate that carbide tools with negative rake angles should be used for the rough machining, or roughing, of titanium alloys when possible. An advantage of using PCBN tools rather than cemented carbide tools arises from the superior refractory 'hot hardness' of the PCBN material, which will likely be particularly advantageous in higher speed cutting operations, in which the speed may be at least 150 metres per minute (m/min) and relatively higher temperatures will be generated at the interface between the cutting tool and the work-piece.

Although cBN is relatively unreactive with ferrous metals, chemical wear of CBN grains comprised in PCBN material is likely to be evident at the high temperatures reached in continuous machining. Therefore, PCBN comprising a relatively high content of cBN grains is likely to be used in operations such as interrupted machining, in which the tool insert material needs to be relatively strong and maintain its hardness at relatively high temperatures. PCBN material comprising a relatively lower content of cBN grains is likely to be used in operations such as continuous machining, in which the tool insert material needs to be relatively resistant to chemical wear. The strength of PCBN material comprising relatively large cBN grains is generally likely to lower than that of PCBN material comprising relatively small (fine) cBN grains, all else being equal (this may be particularly evident where the content of cBN is relatively high). Therefore, fine grain PCBN is likely to be stronger and produce a better work-piece surface finish than coarser grain PCBN material.

In general, end mill tools comprising PCBN cutting elements tend to exhibit longer tool life when the cutting speed is about 300 to about 1,200 metres per minute (m/min.). High quality surface finishes substantially free of a 'white layer' can be achieve by means of using PCBN milling tools, which will likely reduce the amount and cost of processing the work-piece to final finish and dimensions after the work-piece has been milled. The manufacture of molds, dies and joints may include machining cemented carbide material or carbide coated material at cutting speeds of about 100 to about 300 m/min and PCBN mill tool may result in superior tool performance, tool life and machined work-piece quality that mill tools comprising cemented carbide cutting elements.

In example arrangements in which an article has generally cylindrical in shape, having a pair of opposite ends connected by an side, reference to cylindrical coordinates will be used to describe certain features of the configuration of the article. In particular, a 'cylindrical' or 'longitudinal' axis will pass through the centres of each of the ends and the article will have a degree of rotational symmetry about this axis. Planes perpendicular to the longitudinal axis and passing through the substrate or pre-form body may be referred to as 'lateral' or 'radial' planes and the distances of points on the lateral plane from the longitudinal axis may be referred to as 'radial distances' or 'radial positions' or the like. Directions towards or away from the longitudinal axis on a lateral plane may be referred to as 'radial directions'. The term 'azimuthal' will refer to directions or positions on a lateral plane, circumferentially about the longitudinal axis.

The invention claimed is:

1. A method of making a super-hard end mill tool comprising a super-hard structure bonded to a substrate, the super-hard structure comprising a sintered plurality of super-hard grains;
   said super-hard grains comprising:
      cubic boron nitride crystals and the super-hard structure comprising polycrystalline cubic boron nitride (PCBN) material; and
   said method comprising:
      providing raw material powder suitable for sintering the super-hard structure;
      combining the raw material powder with an organic binder material in a liquid medium to form a paste, wherein the organic binder material is insoluble in water and wherein the content of the raw material powder is more than 60 and less than 85 mass percent of the paste and the composition of the paste is such that it has a shear rate of at most 25 inverse second (s-1);
      providing a substrate assembly comprising the substrate, having a formation surface area configured for forming a boundary of the super-hard structure, the substrate comprising an outer surface circumscribing a central axis of the substrate and defining an outer diameter and four azimuthally equidistant recesses extending from one end of the substrate to the opposite end and coterminous with the formation surface area, wherein the surfaces of the recesses provide the formation surface areas of the substrate, each recess only partially extending radially inwards from the outer surface of the substrate without reaching the central axis of the substrate, the diameter of the substrate and depth of the recess being slightly larger than required;
      extruding the paste into contact with the formation surface area to provide a paste assembly whilst still retaining a recess, wherein the extruded paste is recessed from the outer surface of the substrate;
      heat treating the paste assembly to remove the binder material and provide a pre-sinter assembly;
      subjecting the pre-sinter assembly to a pressure and temperature sufficient to sinter the raw material powder and transform it into a sintered assembly including a sintered super-hard structure bonded to the substrate at a boundary coterminous with the formation surface area, wherein the super-hard structure comprises an outer surface that is recessed from the outer surface of the substrate and a coterminous boundary in a shape of the super-hard structure;
      grinding the sintered assembly to a desired diameter to remove the substrate until the outer surface of the substrate is equidistant with the outer surface of the super-hard structure from the central axis; and
      further processing the super-hard structure and the substrate by means of grinding to provide super-hard structures with cutting edges and to form flutes into the substrate azimuthally between the super-hard structures, to provide a cutting element for the end mill tool.

2. The method as claimed in claim 1, wherein the content of the raw material powder is 70 to 80 mass percent of the paste.

3. The method as claimed in claim 1, wherein the formation surface area includes a planar area.

4. The method as claimed in claim 1, further comprising applying a pressure of 5 to 9 megapascals (MPa) to the paste.

5. The method as claimed in claim 1, wherein the substrate comprises cemented carbide material.

6. The method as claimed in claim 1, wherein the substrate comprises super-hard material coterminous with the formation area.

7. The method as claimed in claim 1, wherein the substrate comprises precursor material capable of being sintered to form polycrystalline super-hard material, the precursor material being coterminous with the formation surface area.

8. The method as claimed in claim 1, wherein the substrate assembly comprises a layer of precursor material capable of being sintered to form polycrystalline super-hard material, the layer in contact with cemented carbide material and coterminous with the formation surface area.

9. The method as claimed in claim 1, wherein the super-hard end mill tool comprises first and second polycrystalline super-hard materials bonded to each other and differing in at least one characteristic; the method further comprising
   depositing precursor material paste for forming the first polycrystalline super-hard material into contact with the substrate to provide the substrate assembly, the precursor material paste for the first super-hard material comprising organic binder material in a liquid medium and more than 60 and less than 85 mass percent precursor powder and having a shear rate of at most 25 inverse second (s-1); and a surface of the precursor material paste being coterminous with the formation surface area; wherein the super-hard structure comprises the second polycrystalline super-hard material.

10. The method as claimed in claim 1, wherein the substrate assembly comprises a member in contact with the substrate, configured to form a cavity formed between the formation surface area and a boundary of the member, the cavity configured for forming the super-hard structure; the method further comprising extruding the paste into the cavity.

11. The method as claimed in claim 1, wherein the substrate comprises cemented carbide material and has a pair of opposite ends connected by a side including an elongate recess coterminous with the formation surface area and extending between the opposite ends.

12. The method as claimed in claim 1, further comprising
   encapsulating the substrate assembly within a capsule suitable for a pressure press apparatus and subjecting the capsule to the pressure and the temperature;
   removing the capsule from the press apparatus, and removing capsule material from the super-hard end mill tool.

13. The method as claimed in claim 1, wherein the super-hard end mill tool has a substantially cylindrical shape, comprising a cylindrical side connecting opposite ends, a surface of the substrate and a surface of the super-hard structure being coterminous with the side.

14. The method as claimed in claim 1, wherein the super-hard end mill tool comprises a plurality of elongate super-hard structures arranged along helical paths.

* * * * *